United States Patent Office 3,405,792
Patented Oct. 15, 1968

3,405,792
CLUTCH RELEASE BEARINGS
Albert Borgella, 33 Rue Francois Vincent Raspail, Arcueil, France, and Pierre de Raveton, 42 Rue de Dantzig, Paris, France
Filed Sept. 29, 1966, Ser. No. 582,845
Claims priority, application France, Oct. 1, 1965, 33,430
4 Claims. (Cl. 192—98)

ABSTRACT OF THE DISCLOSURE

An annular clutch release bearing adapted to surround a shaft and carried on an inner cage which is pivoted to an outer cage by pivot pins which permits the inner cage to slide radially with respect to the outer cage. The outer cage is pivoted to a yoke on pivot means having an axis perpendicular to the axis of said pins. Spring means urge the inner cage to slide to a predetermined position relative to the outer cage.

---

The mechanism of a dry friction clutch is controlled by the axial displacement of a sleeve or of a ring actuated by a clutch release bearing, the latter consisting either of a ball bearing or of a graphite ring.

The clutch release bearing is housed in a cage surrounding the clutch shaft of the gear box and comprising two diametrically opposite pivot pins, the axes of which are perpendicular to said clutch shaft.

These pivot pins are supported by the end of a yoke or fork consisting of two radial arms keyed on to a shaft mounted parallel with the axis of said pins and the pivoting of which is controlled from the clutch pedal.

When the clutch pedal is actuated, the fork rocks and the bearing is displaced axially pushing back the sleeve or the ring controlling the clutch release mechanism.

The path of the axis of the pivot pins is therefore curvilinear and, as a result, the axial displacement of the cage is always accompanied by a radial displacement.

This radial displacement of the bearing in relation to the face of the sleeve or of the control ring of the mechanism gives rise to friction causing premature wear of said bearing.

On the other hand, the bearing can only pivot about a single axis, that of said two pins and as a result, the parallelism of the surfaces in contact (sliding face and bearing) is not always assured and this produces wear of said bearing.

The present invention, which overcomes these disadvantages, is characterized in that the clutch release bearing is mounted in a support capable, on the one hand of pivoting inside a cage replacing the one referred to above, about an axis perpendicular to the two pivot pins thereof, and on the other hand of sliding along said axis.

According to one embodiment, the bearing is supported by an inner cage comprising two diametrically opposite pivot pins capable of pivoting and of sliding in corresponding bores in an outer cage comprising the two usual support pins, the axes of the two pairs of pivot pins being perpendicular in the manner of gimbals.

The inner cage is capable of radial displacement in the outer cage along the axis of its pivot pins and, for this purpose, a clearance, which is at least equal to the radial displacement of an ordinary bearing, is left between said cages.

A return spring, guided by the pivot pin of the inner cage situated opposite to the shaft of the yoke, biases said cage towards said shaft.

The pivoting of the yoke subjects the outer cage to a force comprising a thrust component leading to the axial displacement of the bearing and a radial component directed along the axis of the pivot pins of the inner cage.

According to the present invention, this harmful radial component has no effect on the inner cage because the two cages can slide relative to each other in this direction.

Actually, the bearing is supported by adhering to the face of the sleeve or of the ring which engages and it is subjected solely to the action of the thrust component through the pivot pins of its supporting cage; on the other hand, under the action of the radial component, the outer cage is displaced along the axis of the pivot pins of the inner cage, compressing said return spring, since the force exerted by that spring is less than the frictional forces holding said bearing against the member which it engages.

In this manner, the clutch release bearing is not subject to any radial displacement which could lead to its premature wear.

Finally, it follows from the invention that the bearing can pivot about two perpendicular axes, this ability enabling it to be applied perfectly against the member which it engages.

The present invention will be better understood from the following description and with reference to the accompanying drawing given solely by way of example and in which.

Figure 1:
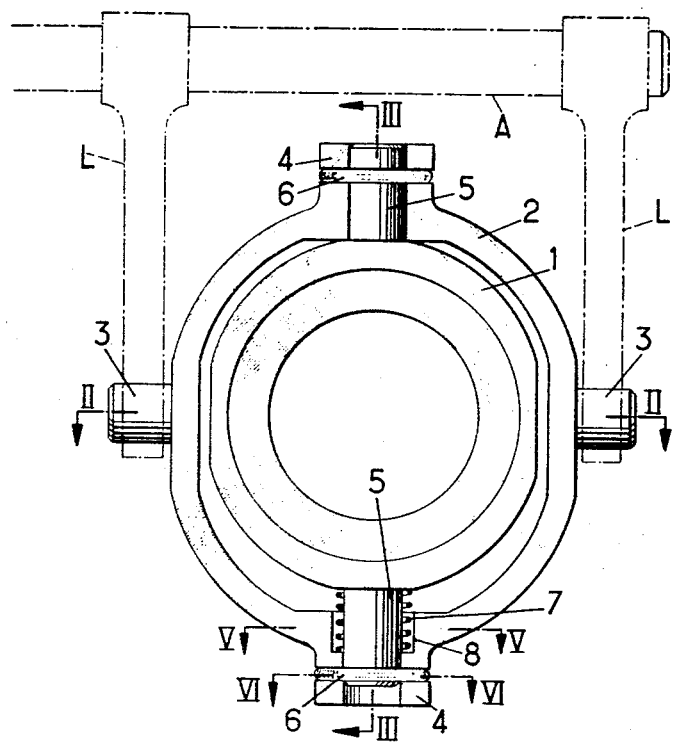
FIGURE 1 is a front view of the device of the invention illustrated at rest.
Figure 2:
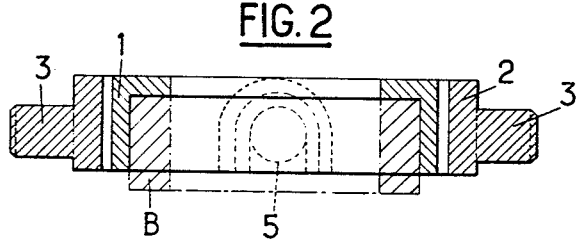
FIGURE 2 is a view in section along the line II—II of FIGURE 1.
Figure 3:
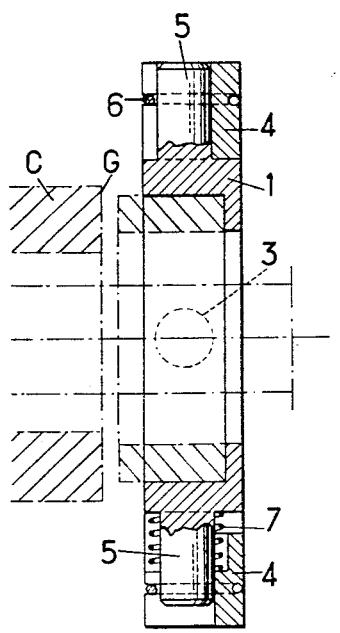
FIGURE 3 is a view in section along the line III—III of FIGURE 1.

Referring to the drawing and according to one embodiment, the clutch release bearing B (FIG. 2) is housed in a cage 1 capable of displacement inside an outer cage 2.

The cage 2 comprises two conventional diametrically opposite pivot pins 3, the axes of which are perpendicular to the axis of the bearing B.

The pivot pins 3 are supported by the end of a yoke or fork consisting of two radial arms L keyed on to a shaft A, parallel with the axis of said pivot pins and actuated by the conventional clutch pedal.

According to the present invention, the cage 2 comprises two diametrically opposite half-bearings 4, perpendicular to the axis of the pivot pins 3.

The cage 1 comprises two diametrically opposite pivot pins 5 which can pivot and slide in the half-bearings 4, said pivot pins being held in their respective bearing by means of a resilient ring 6, for example.

The cage 1 is constantly subject to the action of a spring 7, engaged over the pivot pin 5 situated opposite to the shaft A with respect to the axis of the pins 3, bearing against the shoulder at the end of a recess 8 in the corresponding half-bearing 4 of the cage 2, the purpose of which will be apparent hereinafter.

The extent of the sliding between the half-bearings 4 and the pivot pins 5 is at least equal to the radial displacement to which a bearing is subjected during the disengagement of the clutch.

Figure 4:
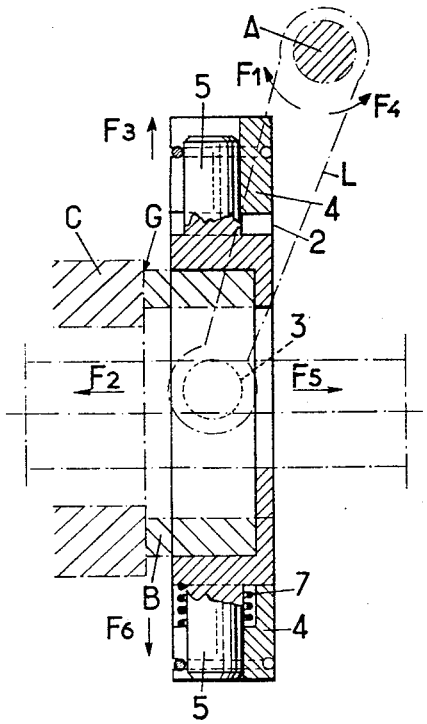
FIGURE 4 is a similar view to FIGURE 3, the device being illustrated in the course of releasing the clutch.
Figure 5:
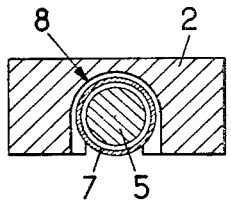
FIGURE 5 is a view in section along the line V—V of FIGURE 1.
Figure 6:
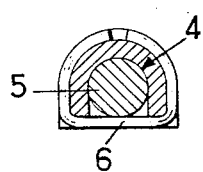
FIGURE 6 is a view in section along the line VI—VI of FIGURE 1.

The operation of the device is as follows:

When the yoke or fork L pivots in the direction of the arrow $F_1$ (FIG. 4), it transmits to the cage 2 a force comprising a thrust component tending to displace it in the direction of the arrow $F_2$ and a radial component tending to displace it in the direction of the arrow $F_3$.

Under the stress of the thrust component which is transmitted by the half-bearings 4 to the pivot pins 5, the cage 1 is displaced and its bearing B is applied against the face G of the ring C controlling the clutch release mechanism.

The radial component has no effect on the cage 1 because the latter is not connected to the cage 2 in this direction, and the half-bearings 4 can slide on the pivot pins 5.

Since the friction between the bearing B against and the face G is greater than the force exerted by the spring 7, the cage 2 is displaced in the direction of the arrow $F_3$ compressing said spring without entraining the cage 1 in the direction of the arrow $F_3$.

When the clutch pedal is released, the fork L pivots in the direction of the arrow $F_4$, the cage 2 drives the cage 1 in the direction of the arrow $F_5$, opposite to that of $F_2$, and, under the pressure of the spring 7, which expands, said cage 1 slides radially in the direction of the arrow $F_6$ to resume its initial position.

During the operations of engagement and disengagement of the clutch, the bearing B is therefore not subjected to any radial pressure which might cause undesirable friction leading to its premature wear.

Needless to say, the present invention is not limited to the embodiment described and illustrated but extends, on the contrary, to all modifications in shape and dimensions.

What is claimed is:

1. In a mounting for a clutch release bearing of the type comprising a yoke, and an annular cage pivotally mounted in said yoke, the improvement which comprises an inner cage carrying said release bearing, said inner cage being pivotally mounted within said annular cage to turn about an axis perpendicular to the pivotal axis of said outer cage and to slide along said perpendicular axis relative to said outer cage within predetermined limits, and resilient means biasing said inner cage toward a predetermined position relative to said outer cage.

2. A mounting for a clutch release bearing as claimed in claim 1 in which said annular cage is provided with bearing means aligned along said perpendicular axis, said inner cage has an outer diameter smaller than the inner diameter of said annular cage and carries pivot pins seated in said aligned bearing means, and said resilient means is a spring encircling one of said pivot pins and compressed between said annular and inner cages.

3. A mounting as claimed in claim 2 in which said spring is positioned to bias said inner cage toward the closed side of said yoke.

4. A mounting as claimed in claim 3 in which the force exerted by said spring is less than the frictional force acting to cause relative axial displacement between said pivot pins and said aligned bearings when said clutch is engaged.

References Cited
UNITED STATES PATENTS 2,093,799 9/1937 Bemis.
3,277,988 10/1966 Pitner _____ 192—98

BENJAMIN W. WYCHE III, *Primary Examiner*.